United States Patent
Lu et al.

(10) Patent No.: US 12,339,672 B2
(45) Date of Patent: Jun. 24, 2025

(54) METHOD FOR PROTECTION UNMANNED AERIAL VEHICLE AND UNMANNED AERIAL VEHICLE

(71) Applicant: AUTEL ROBOTICS CO., LTD., Guangdong (CN)

(72) Inventors: Minghua Lu, Guangdong (CN); Kangli Wang, Guangdong (CN)

(73) Assignee: AUTEL ROBOTICS CO., LTD., Guangdong (CN)

( * ) Notice: Subject to any disclaimer, the term of this patent is extended or adjusted under 35 U.S.C. 154(b) by 260 days.

(21) Appl. No.: 18/171,896

(22) Filed: Feb. 21, 2023

(65) Prior Publication Data
US 2023/0280763 A1    Sep. 7, 2023

Related U.S. Application Data

(63) Continuation of application No. PCT/CN2021/108889, filed on Jul. 28, 2021.

(30) Foreign Application Priority Data

Aug. 21, 2020 (CN) .......................... 202010852457.0

(51) Int. Cl.
*G05D 1/00* (2024.01)
*B64D 45/00* (2006.01)
*B64U 50/10* (2023.01)

(52) U.S. Cl.
CPC ........... *G05D 1/0808* (2013.01); *B64D 45/00* (2013.01); *B64U 50/10* (2023.01); *G05D 1/0055* (2013.01)

(58) Field of Classification Search
CPC ....... B64D 45/00; B64D 45/04; H04W 24/10; G08G 5/0013; G08G 5/0069; G05D 1/02; B64C 13/20
See application file for complete search history.

(56) References Cited

U.S. PATENT DOCUMENTS

2018/0034534 A1*  2/2018  Jalali ................. H04W 24/10
2020/0409394 A1* 12/2020  Liu .................... G08G 5/0013
(Continued)

FOREIGN PATENT DOCUMENTS

| CN | 105446355 A | 3/2016 |
|----|-------------|--------|
| CN | 105867181 A | 8/2016 |

(Continued)

OTHER PUBLICATIONS

International Search Report mailed Sep. 29, 2021; PCT/CN2021/108889.

*Primary Examiner* — Yuri Kan
(74) *Attorney, Agent, or Firm* — Frank Gao, Esq.

(57) ABSTRACT

A method and an apparatus for protecting an unmanned aerial vehicle and an unmanned aerial vehicle are provided. After a positioning system of the unmanned aerial vehicle fails, a flight speed of the unmanned aerial vehicle is acquired at a time point before the positioning system fails, and then a flight state of the unmanned aerial vehicle is determined according to the flight speed, where the flight state includes a low-speed flight state and a high-speed flight state; and then a flight protection strategy of the unmanned aerial vehicle is adjusted according to the flight state. By implementing the method, after the positioning system of the unmanned aerial vehicle is in failure, explosion probability of the unmanned aerial vehicle can be reduced, and flight safety of the unmanned aerial vehicle can be improved.

19 Claims, 5 Drawing Sheets

(56) References Cited

U.S. PATENT DOCUMENTS

2021/0254980 A1\* 8/2021 Wake .................... G08G 5/0069
2022/0024588 A1\* 1/2022 Wake ..................... B64D 45/04

FOREIGN PATENT DOCUMENTS

| CN | 106428585 | A |   | 2/2017  |         |           |
|----|-----------|---|---|---------|---------|-----------|
| CN | 109782789 | A |   | 5/2019  |         |           |
| CN | 110455285 | A |   | 11/2019 |         |           |
| CN | 110597296 | A |   | 12/2019 |         |           |
| CN | 111103898 | A |   | 5/2020  |         |           |
| CN | 111344651 | A |   | 6/2020  |         |           |
| CN | 112000118 | A |   | 11/2020 |         |           |
| EP | 2671796   | A1|   | 12/2013 |         |           |
| JP | H10138999 | A | \*| 5/1998  | ............. | B64C 13/20 |
| JP | 2584468   | Y2| \*| 11/1998 | ............... | G05D 1/02 |
| KR | 101746794 | B1|   | 6/2017  |         |           |

\* cited by examiner

METHOD FOR PROTECTION UNMANNED AERIAL VEHICLE AND UNMANNED AERIAL VEHICLE

CROSS-REFERENCE TO RELATED APPLICATIONS

This application is a continuation of International Application No. PCT/CN2021/108889, filed on Jul. 28, 2021, which claims priority to Chinese Patent Application No. 2020108524570, filed on Aug. 21, 2020, which is incorporated herein by reference in its entirety.

BACKGROUND

Technical Field

The present disclosure relates to unmanned aerial vehicle technologies, and in particular to a method for protecting an unmanned aerial vehicle and an unmanned aerial vehicle.

Related Art

Along with continuous development of aerial photography technology of unmanned aerial vehicles, more and more consumer-grade unmanned aerial vehicles are in a course of being produced and developed. The unmanned aerial vehicles are increasingly popularized. There are many manners for controlling the unmanned aerial vehicles, such as a remote controller, a mobile phone, a computer and other mobile terminals.

However, in the flight process of the unmanned aerial vehicles, outdoor position control is mainly performed according to position coordinates provided by a Global Position System (GPS), indoor position control is mainly performed according to positions provided by a binocular vision algorithm, and when the GPS and binocular vision are valid, any position of the unmanned aerial vehicles in the air can be kept unchangeable, namely a position mode. But a work environment of the unmanned aerial vehicles is complex, in an interfering area, GPS signals will become very weak so that the unmanned aerial vehicles cannot receive the GPS signals, and when the weather is poor, the binocular vision positioning manner will be greatly influenced as well. When both the GPS and the binocular vision positioning manner fail, a flight mode of the unmanned aerial vehicle is switched into an attitude mode from the position mode through a state controller, but the attitude mode has a characteristic of random flying all around, resulting in explosion possibility of unmanned aerial vehicles, which is very dangerous.

SUMMARY

In order to solve above technical problems, embodiments of the present disclosure provide a method for protecting an unmanned aerial vehicle and an unmanned aerial vehicle, which reduces the explosion probability of the unmanned aerial vehicle, and improves flight safety under a situation of positioning system failure.

In order to solve the above technical problems, embodiments of the present disclosure provide the following technical solutions:

In a first aspect, the embodiment of the present disclosure provides a method for protecting an unmanned aerial vehicle, including:

after a positioning system of the unmanned aerial vehicle fails, acquiring a flight speed of the unmanned aerial vehicle at a time point before the positioning system fails, determining a flight state of the unmanned aerial vehicle according to the flight speed; and adjusting a flight protection strategy of the unmanned aerial vehicle according to the flight state.

Optionally, the flight state includes a low-speed flight state and a high-speed flight state, and the determining a flight state of the unmanned aerial vehicle according to the flight speed includes:

when the flight speed is within a low-speed threshold range, determining the flight state of the unmanned aerial vehicle as the low-speed flight state; and when the flight speed is within a high-speed threshold range, determining the flight state of the unmanned aerial vehicle as the high-speed flight state.

Optionally, the adjusting a flight protection strategy of the unmanned aerial vehicle according to the flight state includes:

acquiring attitude angle information and a current flight height of the unmanned aerial vehicle when the flight state is the low-speed flight state;

adjusting the flight attitude of the unmanned aerial vehicle according to the attitude angle information;

controlling the unmanned aerial vehicle to climb to a preset height from the current flight height after waiting for a preset time threshold; and determining if the unmanned aerial vehicle receives positioning data;

if the unmanned aerial vehicle does not receive the positioning data, adjusting the flight attitude into a protection attitude.

Optionally, the attitude angle information includes a pitch angle, a roll angle and a yaw angle; and the adjusting the flight attitude of the unmanned aerial vehicle according to the attitude angle information includes:

keeping the pitch angle and the roll angle within a preset angle range, and controlling the yaw angle to be unchanged.

Optionally, the adjusting the flight attitude into a protection attitude includes:

keeping the pitch angle and the roll angle within the preset angle range, reducing the flight height of the unmanned aerial vehicle, and controlling the yaw angle to rotate with the preset angular rate.

Optionally, the adjusting a flight protection strategy of the unmanned aerial vehicle according to the flight state includes:

acquiring attitude angle information, a current flight height and a throttle value of the unmanned aerial vehicle when the flight state is the high-speed flight state;

adjusting the flight attitude of the unmanned aerial vehicle according to the attitude angle information, the current flight height and the throttle value;

determining if the unmanned aerial vehicle receives the positioning data after waiting for the preset time threshold;

if the unmanned aerial vehicle does not receive the positioning data, controlling the unmanned aerial vehicle to hover and drop to a set height, controlling the current throttle value of the unmanned aerial vehicle to be unchanged, and keeping a current roll angle of the unmanned aerial vehicle at a preset roll angle; and adjusting the flight attitude into the protection attitude when the flight height of the unmanned aerial vehicle is detected to be lower than a preset height threshold.

Optionally, the attitude angle information includes the pitch angle, the roll angle and the yaw angle; and the adjusting the flight attitude of the unmanned aerial vehicle according to the attitude angle information includes:

controlling a current flight height of the unmanned aerial vehicle to be unchanged and hover with the preset roll angle, and controlling the throttle value to be unchanged.

Optionally, the adjusting the flight attitude into a protection attitude when the unmanned aerial vehicle is detected to be lower than a preset height threshold includes:

keeping the pitch angle and the roll angle within the preset angle range, controlling the yaw angle to be unchanged, and controlling the throttle value to be reduced to zero with the preset rate; and after waiting for the preset time threshold, keeping the pitch angle and the roll angle within the preset angle range, reducing the flight height of the unmanned aerial vehicle, and controlling the yaw angle to rotate with the preset angular rate.

Optionally, the preset angle range is (−2°, 2°).

In a second aspect, the embodiment of the present disclosure provides an apparatus for protecting an unmanned aerial vehicle, including:

a flight speed acquiring module, configured to: after the positioning system of the unmanned aerial vehicle fails, acquire a flight speed of an unmanned aerial vehicle at a time point before a positioning system fails;

a flight state determining module, configured to determine a flight state of the unmanned aerial vehicle according to the flight speed; and a flight protection strategy adjusting module, configured to adjust a flight protection strategy of the unmanned aerial vehicle according to the flight state.

In a third aspect, the embodiment of the present disclosure provides an unmanned aerial vehicle, including: an unmanned aerial vehicle body;

unmanned aerial vehicle arms connected to the unmanned aerial vehicle body;

a power system arranged on the unmanned aerial vehicle arms and configured to provide flight power for the unmanned aerial vehicle; and a flight controller arranged on the unmanned aerial vehicle body, where the flight controller includes:

at least one processor; and a memory in communication connection with the at least one processor, where the memory stores instructions executable by the at least one processor, and the instructions, when executed by the at least one processor, cause the at least one processor to execute the above method for protecting an unmanned aerial vehicle.

Compared with existing technologies, according to the unmanned aerial vehicle protection method in the embodiment of the present disclosure, after the positioning system of the unmanned aerial vehicle fails, acquiring the flight speed of the unmanned aerial vehicle at the time point before the positioning system fails, and then the flight state of the unmanned aerial vehicle is determined according to the flight speed, where the flight state includes the low-speed flight state and the high-speed flight state; and then the flight protection strategy of the unmanned aerial vehicle is adjusted according to the flight state. The above method can reduce the explosion probability of the unmanned aerial vehicle, and improve flight safety of the unmanned aerial vehicle after the system of the unmanned aerial vehicle fails.

BRIEF DESCRIPTION OF THE DRAWINGS

One or more embodiments are exemplarily described with reference to the corresponding figures in the accompanying drawings, and the exemplary descriptions are not to be construed as limiting the embodiments. Elements in the accompanying drawings that have same reference numerals are represented as similar elements, and unless otherwise particularly stated, the figures in the accompanying drawings are not drawn to scale.

DETAILED DESCRIPTION

For ease of understanding the present disclosure, the present disclosure is described in more detail below with reference to the accompanying drawings and specific embodiments. It should be explained that, when an element is expressed as "being fixed to" another element, the element may be directly on the another element, or one or more intermediate elements may exist between the element and the another element. When one element is expressed as "being connected to" another element, the element may be directly connected to the another element, or one or more intermediate elements may exist between the element and the another element. In the description of this specification, orientation or position relationships indicated by the terms such as "up", "down", "inside", "outside" and "bottom" are based on orientation or position relationships shown in the accompanying drawings, and are used only for ease and brevity of illustration and description of the present disclosure, rather than indicate or imply that the mentioned apparatus or element must have a particular orientation or must be constructed and operated in a particular orientation. Therefore, such terms should not be construed as limiting of the present disclosure. In addition, terms "first", "second" and "third" are only used to describe the objective and cannot be understood as indicating or implying relative importance.

Unless otherwise defined, meanings of all technical and scientific terms used in the present disclosure are the same as that usually understood by a person skilled in the technical field to which the present disclosure belongs. In the present disclosure, terms used in the specification of the present disclosure are merely intended to describe objectives of the specific embodiments, but are not intended to limit the present disclosure. A term "and/or" used in this specification includes any or all combinations of one or more related listed items.

In addition, technical features involved in different embodiments of the present disclosure described below may be combined together if there is no conflict.

The embodiment of the present disclosure provides a method for protecting an unmanned aerial vehicle. The method includes: when a positioning system of the unmanned aerial vehicle fails, a flight speed of the unmanned aerial vehicle is acquired at a time point before the positioning system fails, and then a flight state of the unmanned aerial vehicle is determined according to the flight speed, where the flight state includes a low-speed flight state and a high-speed flight state; and then a flight protection strategy of the unmanned aerial vehicle is adjusted according to the flight state. The above method can reduce the explosion probability of the unmanned aerial vehicle, and improve flight safety of the unmanned aerial vehicle after the positioning system of the unmanned aerial vehicle fails.

An application environment of the unmanned aerial vehicle protection method is illustrated.

Figure 1:
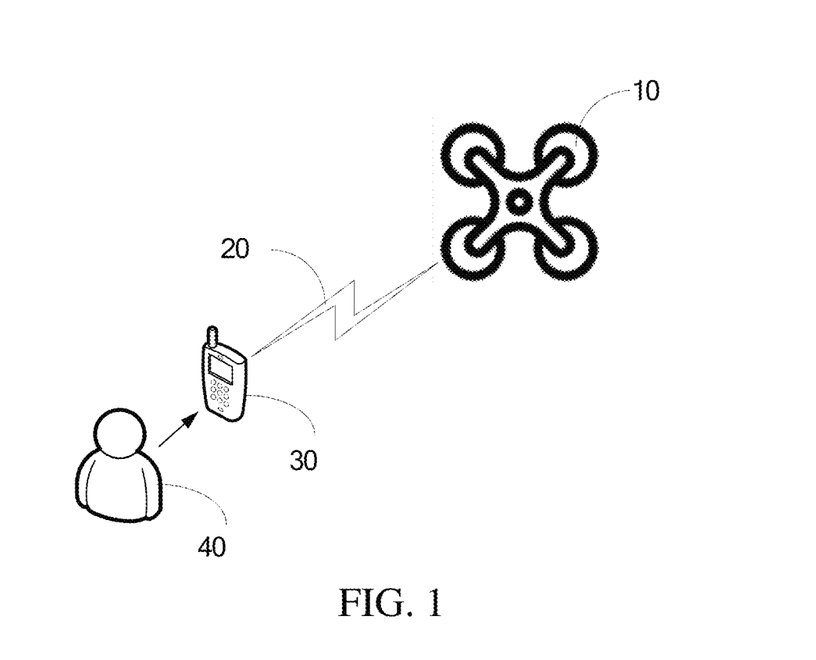
FIG. 1 is a schematic diagram of an application environment according to an embodiment of the present disclosure.

Referring to FIG. 1, FIG. 1 is a schematic diagram of an application environment according to an embodiment of the present disclosure.

As shown in FIG. 1, an application scenario includes an unmanned aerial vehicle 10, a wireless network 20, an intelligent terminal 30 and a user 40. The user 40 can control the unmanned aerial vehicle 10 by controlling the intelligent terminal 30 via a wireless network 20.

In the embodiment of the present disclosure, the unmanned aerial vehicle 10 is a hybrid-wing unmanned aerial vehicle. Unmanned aerial vehicles on the current market mainly include a multi-rotor unmanned aerial vehicle, a fixed-wing unmanned aerial vehicle, an unmanned helicopter, the hybrid-wing unmanned aerial vehicle, and the like. Except the fixed-wing unmanned aerial vehicle, the remaining kinds of the unmanned aerial vehicles can hover in the air and can also fly along a flight airline. Under identical energy consumption, the multi-rotor unmanned aerial vehicle is lowest in speed and shortest in voyage. Propellers of multiple rotors of the multi-rotor unmanned aerial vehicle are all transversely arranged and horizontally rotate relative to a rack, and thus, it is almost impossible to increase the speed of the multi-rotor unmanned aerial vehicle to a higher standard. However, increasing the voyage of the multi-rotor unmanned aerial vehicle necessarily causes increased energy consumption, which is pyrrhic victory. Under the situation, the hybrid-wing unmanned aerial vehicle is produced. In some embodiments, the unmanned aerial vehicle 10 may also be any type of power-driven unmanned flight vehicle, including but not limited to, a rotor unmanned aerial vehicle, the fixed-wing unmanned aerial vehicle, a parafoil unmanned aerial vehicle, a flapping-wing unmanned aerial vehicle, a helicopter model, and the like. The embodiment performs statements with the hybrid-wing unmanned aerial vehicle as an example.

Furthermore, the unmanned aerial vehicle 10 may have a corresponding volume or power according to needs of actual situations, thereby providing a loading capacity, flight speed, flight endurance mileage, and the like, to meet use requirements. One or more kinds of sensors may also be additionally arranged on the unmanned aerial vehicle 10 so that the unmanned aerial vehicle 10 can collect corresponding data.

For example, in the embodiment of the present disclosure, the unmanned aerial vehicle 10 is provided with at least one of sensors including: an accelerometer, a gyroscope, a magnetometer, a GPS navigator and a vision sensor.

The unmanned aerial vehicle 10 further includes a flight controller serving as a control core for flight, data transmission of the unmanned aerial vehicle to integrate one or more modules, thereby performing corresponding logic control programs.

The intelligent terminal 30 may be any type of intelligent apparatus configured to establish communication connection with the unmanned aerial vehicle 10, such as a mobile phone, a tablet personal computer, or an intelligent remote control. One or more kinds of different interaction apparatuses for the user 40 may be assembled on the intelligent terminal 30, which are configured to collect instructions of the user 40 or display and feedback information to the user 40.

These interaction apparatuses include but not limited to: keys, a display screen, a touch screen, a loudspeaker and a remote-control operating lever. For example, the touch display screen may be assembled on the intelligent terminal 30. Through the touch display screen, a remote control instruction of the user 40 for the unmanned aerial vehicle 10 is received, and image information acquired through aerial photography is displayed to the user 40. The user 40 may further touch switch, through the touch display screen, the image information currently displayed by the touch display screen.

In some embodiments, an existing image vision processing technology may also be fused between the unmanned aerial vehicle 10 and the intelligent terminal 30 so that more intelligent services can be further provided. For example, for the unmanned aerial vehicle 10, the intelligent terminal 30 parses an image through a manner of image collection by a binocular camera so that the user 40 can perform gesture control on the unmanned aerial vehicle 10.

The wireless network 20 may be, based on any type of data transmission principle, a wireless communication network configured to establish a data transmission channel between two nodes, such as a Bluetooth network located at different signal frequency bands, a WiFi network, a wireless cellular network or a combination thereof.

Figure 2:
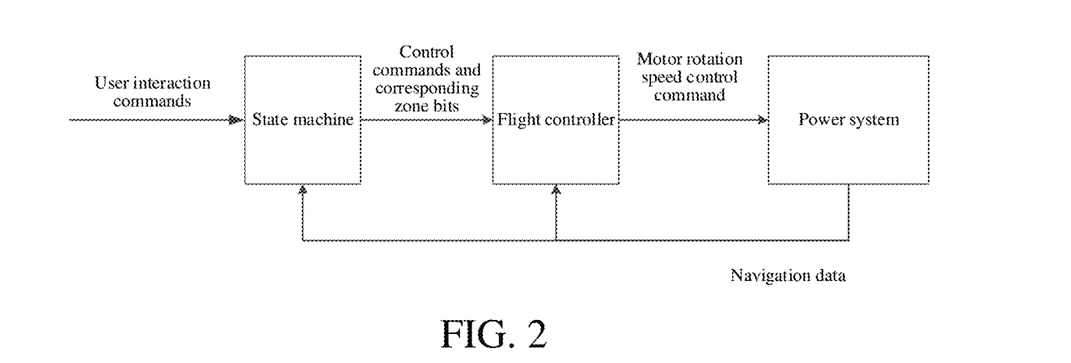
FIG. 2 is a schematic structural diagram of a control system of the unmanned aerial vehicle according to an embodiment of the present disclosure.

Referring to FIG. 2, and FIG. 2 is a schematic structural diagram of an unmanned aerial vehicle control system according to an embodiment of the present disclosure.

In the embodiment of the present disclosure, the unmanned aerial vehicle includes the control system, which includes a state machine, a flight controller, a power system of an unmanned aerial vehicle, an unmanned aerial vehicle sensor, and the like.

As shown in FIG. 2, the control system includes: the state machine, the flight controller and the power system. Specifically, the state machine is connected to the flight controller and the power system, the input of the state machine includes navigation data and user interaction commands, and the output of the state machine includes control instructions and corresponding zone pits. The state machine has a main function of processing the user interaction commands, and adopts the navigation data to realize various functions of the unmanned aerial vehicle, such as flight mode switching, condition monitoring, waypoint flight, course reversal, and other upper-layer functions. The user interaction commands are interaction commands sent by a ground user, such as remote-control lever quantity data, key control commands and other commands, which may be understood that the present disclosure is mainly implemented in the state machine. Specifically, the control commands and the corresponding zone pits outputted by the state machine include a position command, a speed command, an acceleration command, a height command, a climb rate command, a climb acceleration command, an attitude angle command, a course angular rate command, an attitude mode zone pit and a position mode zone pit.

Specifically, the flight controller is connected to the state machine and the unmanned aerial vehicle power system and configured to receive the control commands and the corresponding zone pits sent by the state machine and the navigation data sent by the unmanned aerial vehicle power system, and output a motor rotation speed control command, where the flight controller includes two flight modes: a position mode and an attitude mode. The flight controller has a main function of calculating, through a certain algorithm, the motor rotation speed command by adopting the control commands and the navigation data so that position and attitude control over the unmanned aerial vehicle can be achieved, and accordingly, the position and the attitude of the unmanned aerial vehicle reach an expected state. Specifically, according to the motor rotation speed control command, taking a common rotor unmanned aerial vehicle as an example, the data is motor-controlled Pulse Width Modulation (PWM).

Specifically, the unmanned aerial vehicle power system is connected to the flight controller, includes an execution system and a condition monitoring system and is configured to: receive the motor rotation speed control command sent by the flight controller to realize a corresponding rotation speed, thereby realizing a corresponding attitude angle and position, and process sensor data to indirectly or directly calculate the navigation data. Specifically, the unmanned aerial vehicle power system processes the unmanned aerial vehicle sensor data through a fusion algorithm to obtain the navigation data. For example, the unmanned aerial vehicle power system includes a GPS, a gyroscope, an accelerometer and a magnetometer, and position, speed and acceleration data of the unmanned aerial vehicle can be calculated by the GPS, the gyroscope, the accelerometer and the magnetometer. The position, speed and acceleration data of the unmanned aerial vehicle can be calculated through binocular vision, the gyroscope, the accelerometer and the magnetometer. An attitude angle and an attitude angular rate of the unmanned aerial vehicle can be calculated through the gyroscope, the accelerometer and the magnetometer.

Figure 3:
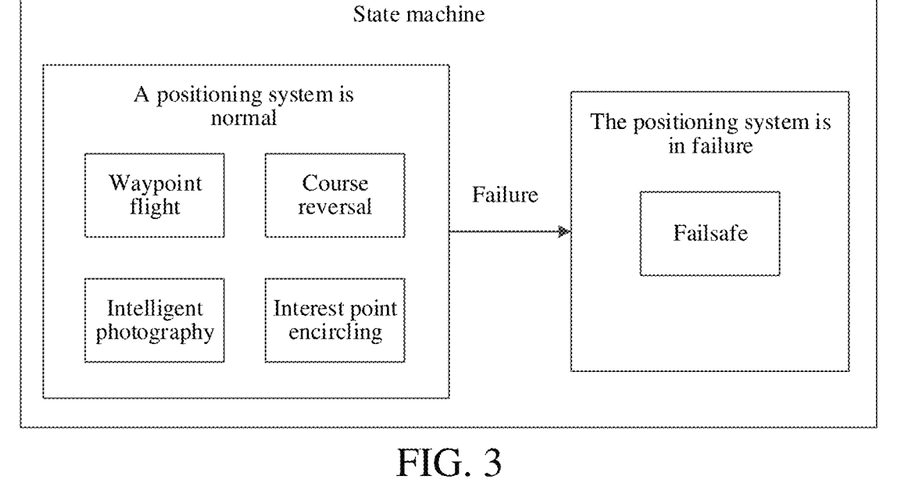
FIG. 3 is a schematic diagram of a state machine according to an embodiment of the present disclosure.

Referring to FIG. 3, FIG. 3 is a schematic diagram of a state machine according to an embodiment of the present disclosure.

As shown in FIG. 3, when the positioning system is normal, the unmanned aerial vehicle can perform waypoint flight, course reversal, intelligent photography, interest point encircling and other upper-layer functions. After the positioning system fails, the unmanned aerial vehicle enters failsafe.

Figure 4:
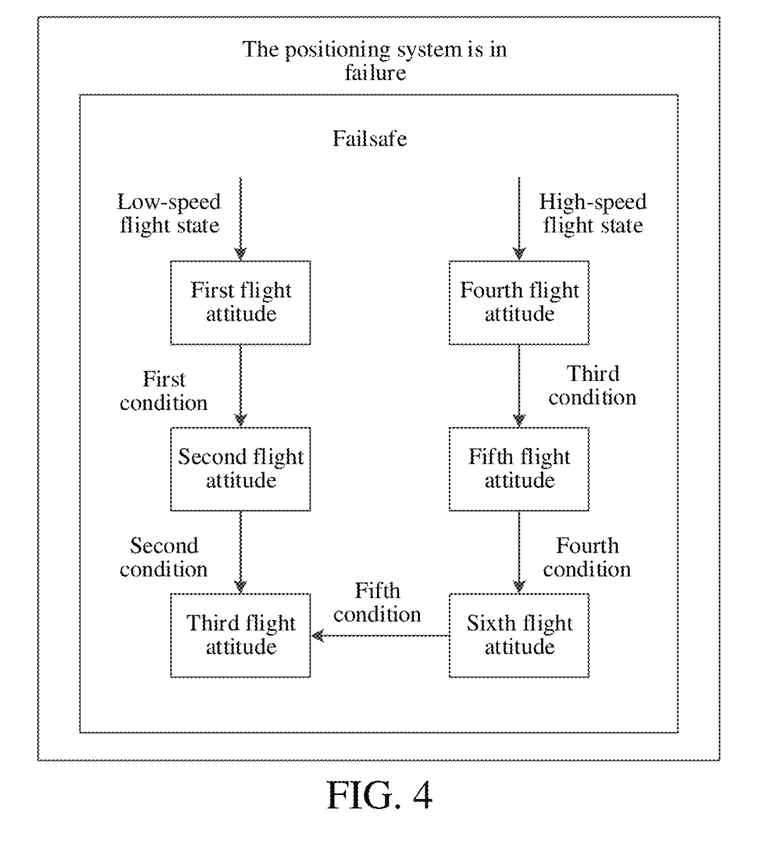
FIG. 4 is a schematic diagram of a failsafe positioning system according to an embodiment of the present disclosure.

Referring to FIG. 4, FIG. 4 is a schematic diagram of failsafe positioning system according to an embodiment of the present disclosure.

As shown in FIG. 4, the flight state of the unmanned aerial vehicle is determined by acquiring the flight speed of the unmanned aerial vehicle at a time point before the positioning system of the unmanned aerial vehicle fails. If the flight state of the unmanned aerial vehicle is the low-speed flight state, the unmanned aerial vehicle is controlled to enter a first flight attitude, that is, the height of the unmanned aerial vehicle is controlled to be kept unchangeable. The speed of the unmanned aerial vehicle is not controlled, and zero is assigned to a speed of the unmanned aerial vehicle. An airspeed of the unmanned aerial vehicle is not controlled. A pitch angle and a roll angle of the unmanned aerial vehicle are controlled to be kept to be close to zero, and a yaw angle of the unmanned aerial vehicle is controlled to be kept unchangeable. The main purpose herein is to reduce the speed of the unmanned aerial vehicle.

After the unmanned aerial vehicle enters the first flight attitude and meets a first condition, that is, after the unmanned aerial vehicle has been in the first flight attitude for a preset time threshold, the unmanned aerial vehicle is controlled to enter a second flight attitude, that is, the speed of the unmanned aerial vehicle is not controlled, and zero is assigned to the speed of the unmanned aerial vehicle. The airspeed of the unmanned aerial vehicle is not controlled. The pitch angle and the roll angle of the unmanned aerial vehicle are controlled to be kept to be close to zero, and the yaw angle of the unmanned aerial vehicle is controlled to be kept unchangeable. The height of the unmanned aerial vehicle is controlled to be increased so that the unmanned aerial vehicle can better acquire positioning data. The increased height herein is a set value, which can be changed according to needs.

After the unmanned aerial vehicle enters the second flight attitude and meets a second condition, the second condition includes: the unmanned aerial vehicle is controlled to enter a third flight attitude if the positioning data is still not acquired after the unmanned aerial vehicle climbs for a period of time, that is, the speed of the unmanned aerial vehicle is not controlled and zero is assigned to the speed of the unmanned aerial vehicle. The airspeed of the unmanned aerial vehicle is not controlled. The pitch angle and the roll angle of the unmanned aerial vehicle are controlled to be close to zero. The height of the unmanned aerial vehicle is controlled to be reduced. The yaw angle of the unmanned aerial vehicle is controlled, so that the yaw angle rotates with a certain angular rate, thereby preventing the unmanned aerial vehicle from flying far.

If the flight state of the unmanned aerial vehicle is the high-speed flight state, the unmanned aerial vehicle is controlled to enter a fourth flight attitude, that is, the height of the unmanned aerial vehicle is controlled to be kept unchangeable. The speed of the unmanned aerial vehicle is not controlled, and zero is assigned to the speed of the unmanned aerial vehicle. The airspeed of the unmanned aerial vehicle is not controlled. A throttle value of the unmanned aerial vehicle is controlled to be unchangeable, which can guarantee that the unmanned aerial vehicle flies in a fixed-wing form. The roll angle of the unmanned aerial vehicle is controlled to be kept as a set value which is related to a hover radius of the unmanned aerial vehicle. A main purpose of controlling the unmanned aerial vehicle to enter the fourth flight attitude is to make the unmanned aerial vehicle, with an unchangeable aerial height, hover with a certain roll angle, and a main purpose of hovering is to wait for the positioning data.

After the unmanned aerial vehicle enters the fourth flight attitude, if a third condition is met, the unmanned aerial vehicle is controlled to enter a fifth flight attitude, where the third condition is that when the unmanned aerial vehicle hovers for a preset time, and the positioning data is not acquired within the preset time, the unmanned aerial vehicle is controlled to enter the fifth flight attitude, that is, a landing action starts. Operations are as below: the unmanned aerial vehicle hovers and drop to a set height. The speed of the unmanned aerial vehicle is not controlled, and zero is assigned to the speed of the unmanned aerial vehicle. The airspeed of the unmanned aerial vehicle is not controlled. The throttle value of the unmanned aerial vehicle is controlled to be unchangeable, which can guarantee that the unmanned aerial vehicle flies in the fixed-wing form. The roll angle of the unmanned aerial vehicle is controlled to be kept as the set value which is related to the hover radius of the unmanned aerial vehicle. The height of the unmanned aerial vehicle is controlled to be reduced.

When the unmanned aerial vehicle enters the fifth flight attitude and meets a fourth condition, the unmanned aerial vehicle is controlled to enter a sixth flight attitude, and the fourth condition is that the flight height of the unmanned aerial vehicle is lower than a preset height. When the unmanned aerial vehicle meets the fourth condition, the unmanned aerial vehicle is controlled to enter the sixth flight attitude, that is, the unmanned aerial vehicle starts to execute a deceleration action, decelerates into the low-speed state from the high-speed state until the speed is close to zero. Specific operations are as below. The speed of the unmanned aerial vehicle is not controlled, and zero is assigned to the speed of the unmanned aerial vehicle. The airspeed of the unmanned aerial vehicle is not controlled. The pitch angle and the roll angle of the unmanned aerial vehicle are controlled to be kept to be close to zero, and the yaw angle of the unmanned aerial vehicle is controlled to be kept unchangeable. The throttle value is controlled to be reduced from the current value to zero with a certain rate.

After the unmanned aerial vehicle enters the sixth flight attitude, if a fifth condition is met, the unmanned aerial vehicle is controlled to enter the third flight attitude. The fifth condition includes: the positioning data is not acquired within the preset time.

It is to be understood that if the unmanned aerial vehicle acquires the positioning data in any flight attitude, the unmanned aerial vehicle retreats from failsafe.

Figure 5:
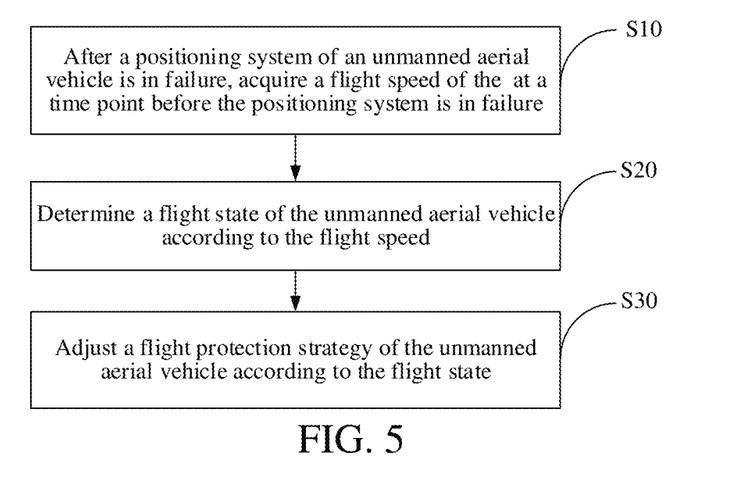
FIG. 5 is a schematic flowchart of a method for protecting the unmanned aerial vehicle according to an embodiment of the present disclosure.

Please refer to FIG. 5, and FIG. 5 is a schematic flowchart of an unmanned aerial vehicle protection method according to an embodiment of the present disclosure. As shown in FIG. 5, the unmanned aerial vehicle protection method may be executed by the flight controller of the unmanned aerial vehicle, including following steps:

step S10: A flight speed of the unmanned aerial vehicle is acquired at a time before the positioning system fails after the positioning system of the unmanned aerial vehicle fails.

Specifically, the failure of the positioning system of the unmanned aerial vehicle means that positioning sensors of the unmanned aerial vehicle, including the GPS, the binocular vision and other apparatuses cannot provide effective position data, or cannot provide indirect data for acquiring positions, where the time before the positioning system of the unmanned aerial vehicle fails refers to a moment before the positioning system of the unmanned aerial vehicle fails, the moment is a time point before the failure time and is used for reflecting the flight speed of the unmanned aerial vehicle at the failure time.

In the flight process of the unmanned aerial vehicle, outdoor position control is mainly performed according to position coordinates provided by the GPS, indoor position control is mainly performed according to positions provided by a binocular vision algorithm, and when the GPS and the binocular vision are valid, it can be guaranteed that any position of the unmanned aerial vehicle in the air can be kept unchangeable, namely a position mode. But a work environment of the unmanned aerial vehicle is complex, in an interfering area, GPS signals will become very weak so that the unmanned aerial vehicle cannot receive the GPS signals, and when the weather is poor, the binocular vision positioning manner will be greatly influenced as well. After the GPS and the binocular vision positioning manner are both in failure, the flight speed of the unmanned aerial vehicle at the time before the positioning system fails is acquired.

In the embodiment of the present disclosure, the flight speed of the unmanned aerial vehicle is acquired by a following method, and the method specifically includes: image information is firstly acquired, gray processing is performed and grayscale images are acquired. An image sensor acquires real-time ground image information, performs gray processing on the acquired real-time image information and acquires a continuous gray scale image. An optical flow speed is acquired by a pyramidal optical flow algorithm, and the flight speed of the unmanned aerial vehicle is acquired according to the optical flow speed and height data of the unmanned aerial vehicle. It should be explained that, the pyramidal optical flow algorithm associates a two-dimensional velocity field with a gray scale, and introduces an optical flow constraint equation to obtain a basic algorithm for optical flow calculation. Two assumptions are proposed based on an optical property of object movement: the gray scale of a moving object is kept unchangeable within a short interval time; and time is continuous or the movement is slight movement, and the image moves slowly along with the time, which actually means that a proportion of the time change is small enough relative to a movement proportion in the image. Then, the image gray scale image is updated, and meanwhile whether the flight speed is greater than a first threshold or not is judged. When the flight speed is greater than the first threshold, a block matching optical flow algorithm is adopted through conversion to acquire the optical flow speed, and on the contrary, the pyramidal optical flow algorithm is continuously used to acquire the optical flow speed. Finally, the flight speed of the unmanned aerial vehicle is acquired according to the optical flow speed and the height data of the unmanned aerial vehicle.

step S20: A flight state of the unmanned aerial vehicle is determined according to the flight speed.

The flight state includes a low-speed flight state and a high-speed flight state.

Specifically, when the flight speed is within a low-speed threshold range, the flight state of the unmanned aerial vehicle is determined as the low-speed flight state. When the flight speed is within a high-speed threshold range, the flight state of the unmanned aerial vehicle is determined as the high-speed flight state. The above low-speed threshold range and the above high-speed threshold range may be set into different threshold ranges according to needs.

Specifically, in the embodiment of the present disclosure, when the flight speed is less than a speed judgment threshold, the flight state of the unmanned aerial vehicle is determined as the low-speed flight state. When the flight speed is higher than the speed judgment threshold, the flight state of the unmanned aerial vehicle is determined as the high-speed flight state. The above speed judgment threshold may be set into different threshold ranges according to needs.

step S30: A flight protection strategy of the unmanned aerial vehicle is adjusted according to the flight state.

The flight protection strategy refers to a protection strategy that after the positioning system of the unmanned aerial vehicle fails, the flight speed, the attitude angle, the throttle value and the flight height of the unmanned aerial vehicle are controlled, thereby realizing safe and stable landing of the unmanned aerial vehicle, and improving flight safety of the unmanned aerial vehicle, where the throttle value refers to a throttle value of a motor rotation speed of the unmanned aerial vehicle.

Specifically, when the flight state is the low-speed flight state, attitude angle information and a current flight height of the unmanned aerial vehicle are firstly acquired, and then the flight attitude of the unmanned aerial vehicle is adjusted according to the attitude angle information; the unmanned aerial vehicle is controlled to climb to a preset height from the current flight height after waiting for a preset time threshold; and whether the unmanned aerial vehicle receives positioning data or not is judged, where if the unmanned aerial vehicle does not receive the positioning data, the flight attitude is adjusted into a protection attitude.

Specifically, when the flight state is the high-speed flight state, attitude angle information, a current flight height and a throttle value of the unmanned aerial vehicle are firstly acquired, and then the flight attitude of the unmanned aerial vehicle is adjusted according to the attitude angle information, the current flight height and the throttle value; whether the unmanned aerial vehicle receives the positioning data or not is judged after waiting for the preset time threshold; and if not, the unmanned aerial vehicle is controlled to hover to drop to the set height, the current throttle value of the unmanned aerial vehicle is controlled to be unchangeable, and a current roll angle of the unmanned aerial vehicle is kept at a preset roll angle.

Thus, in the embodiment of the present disclosure, after the positioning system of the unmanned aerial vehicle fails, acquiring the flight speed of the unmanned aerial vehicle at the time before the positioning system fails, and then the flight state of the unmanned aerial vehicle is determined according to the flight speed, where the flight state includes the low-speed flight state and the high-speed flight state; and then the flight protection strategy of the unmanned aerial vehicle is adjusted according to the flight state. The above method can reduce the explosion probability of the unmanned aerial vehicle, and improve flight safety of the unmanned aerial vehicle after the positioning sensors of the unmanned aerial vehicle are in failure.

Figure 6:
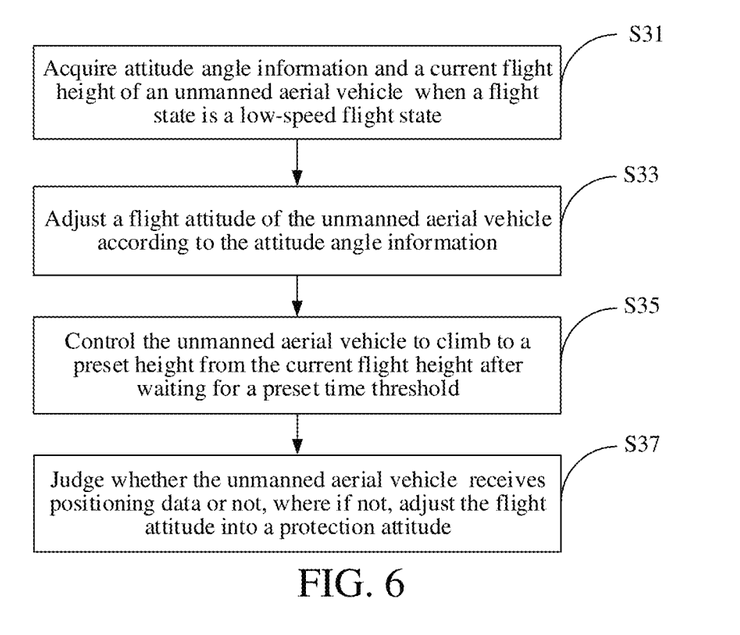
FIG. 6 is a detailed schematic flowchart of one embodiment in step S30 in FIG. 5.

To better adjust the flight protection strategy of the unmanned aerial vehicle according to the flight state, in the embodiment of the present disclosure, please refer to FIG. 6, and FIG. 6 is a detailed schematic flowchart of one embodiment in step S30 in FIG. 5.

As shown in FIG. 6, the step S30 includes the following steps:

step S31: an attitude angle information and a current flight height of the unmanned aerial vehicle is acquired when the flight state is the low-speed flight state.

Specifically, the attitude angle information and the current flight height of the unmanned aerial vehicle are acquired when the flight speed is within the low-speed threshold range or the flight speed is less than the speed judgment threshold. The attitude angle information includes the pitch angle, the roll angle and the yaw angle.

Specifically, the unmanned aerial vehicle is provided with an air pressure detection apparatus. In the embodiment of the present disclosure, the air pressure detection apparatus acquires the current flight height and includes an air pressure gauge, a sensor protection cover and a duct. The air pressure gauge is arranged in the sensor protection cover in a sealed manner and is installed on the unmanned aerial vehicle 10 together with the sensor protection cover. One end of the duct communicates with the sensor protection cover, and the other end of the duct penetrates out of the sensor protection cover and then extends upwards. According to the present disclosure, by arranging the sensor protection cover and the duct, and setting a duct port position in a top end of the duct to extend upwards, an external environment where the air pressure gauge is located can be effectively isolated from turbulent flow generated due to paddle rotation, thereby preventing the air pressure gauge from being disturbed by an instable air pressure environment, and ensuring accurate detection on the current flight height.

step S33: The flight attitude of the unmanned aerial vehicle is adjusted according to the attitude angle information.

Specifically, the pitch angle and the roll angle are kept within a preset angle range, and the yaw angle is controlled to be kept unchangeable. The pitch angle and the roll angle of the unmanned aerial vehicle are controlled to be kept to be close to zero, and the yaw angle of the unmanned aerial vehicle is controlled to be kept unchangeable. The preset angle range is (−2°, 2θ).

Specifically, in the embodiment of the present disclosure, in order to adjust the flight attitude of the unmanned aerial vehicle, the method further includes: the current flight height of the unmanned aerial vehicle is controlled to be kept unchangeable. The flight speed of the unmanned aerial vehicle is not controlled, and zero is assigned to the speed of the unmanned aerial vehicle. The airspeed of the unmanned aerial vehicle is not controlled, where the airspeed refers to a speed of an aircraft relative to air, which is one of basic conditions of deciding an apparatus processing capacity. The main purpose of the above content is to reduce the flight speed of the unmanned aerial vehicle.

step S35: The unmanned aerial vehicle is controlled to climb to a preset height from the current flight height after waiting for a preset time threshold.

Specifically, after waiting for the preset time threshold, the preset time threshold is time when the unmanned aerial vehicle decelerates to a value close to zero, and the preset time threshold can be adjusted according to different unmanned aerial vehicle types.

step S37: Whether the unmanned aerial vehicle receives positioning data or not is judged, where if not, the flight attitude into a protection attitude is adjusted.

Specifically, after the current flight height is increased to the preset height, the unmanned aerial vehicle can get away from the interfering area and receive the GPS signals, or influences on the binocular vision positioning manner can be weakened, and accordingly, the positioning data can be reacquired. If the positioning data cannot be reacquired, the pitch angle and the roll angle are kept within the preset angle range, the flight height of the unmanned aerial vehicle is reduced, and the yaw angle is controlled to rotate with a preset angular rate, thereby preventing the unmanned aerial vehicle from flying far.

In the embodiment of the present disclosure, in order to better adjust the flight attitude of the unmanned aerial vehicle into the protection attitude and guarantee flight safety of the unmanned aerial vehicle, the method further includes: the flight speed of the unmanned aerial vehicle is controlled, zero is assigned to the speed of the unmanned aerial vehicle and the airspeed of the unmanned aerial vehicle is not controlled.

Figure 7:
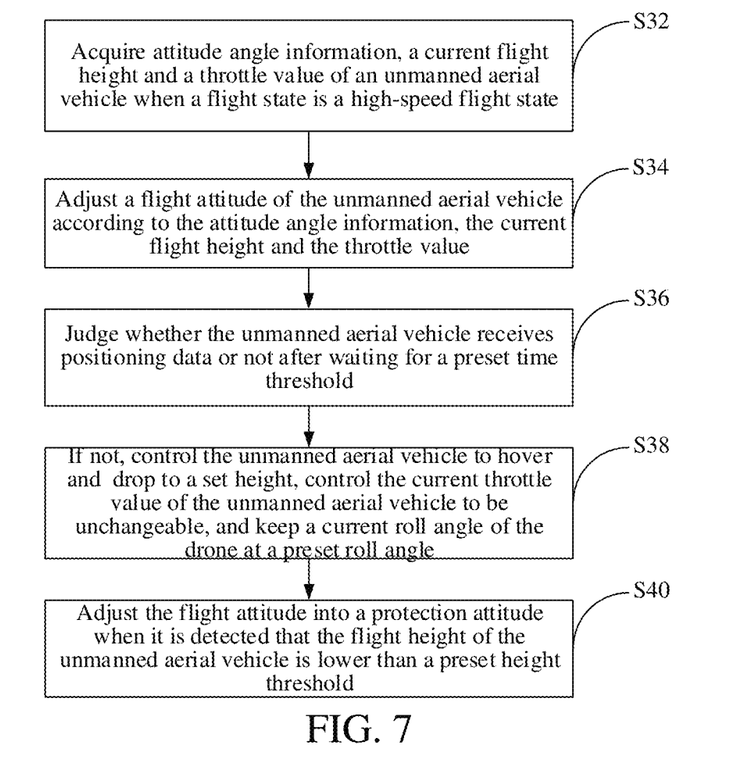
FIG. 7 is a detailed schematic flowchart of another embodiment in step S30 in FIG. 5.

In order to better adjust the flight protection strategy of the unmanned aerial vehicle according to the flight state, in the embodiment of the present disclosure, please refer to FIG. 7, and FIG. 7 is a detailed schematic flowchart of another embodiment in step S30 in FIG. 5.

As shown in FIG. 7, the step S30 further includes following steps:

step S32: A attitude angle information, a current flight height and a throttle value of the unmanned aerial vehicle is acquired when the flight state is the high-speed flight state.

Specifically, the attitude angle information and the current flight height of the unmanned aerial vehicle are acquired when the flight speed is within the high-speed threshold range or the flight speed is greater than the speed judgment threshold. The attitude angle information includes the pitch angle, the roll angle and the yaw angle.

Specifically, the unmanned aerial vehicle is provided with an air pressure detection apparatus. In the embodiment of the present disclosure, the air pressure detection apparatus acquires the current flight height and includes an air pressure gauge, a sensor protection cover and a duct. The air pressure gauge is arranged in the sensor protection cover in a sealed manner and is installed on the unmanned aerial vehicle 10 together with the sensor protection cover. One end of the duct communicates with the sensor protection cover, and the other end of the duct penetrates out of the sensor protection cover and then extends upwards. According to the present disclosure, by arranging the sensor protection cover and the duct, and setting a duct port position in a top end of the duct to extend upwards, an external environment where the air pressure gauge is located can be effectively isolated from turbulent flow generated due to paddle rotation, thereby preventing the air pressure gauge from being disturbed by an instable air pressure environment, and ensuring accurate detection on the current flight height.

step S34: The flight attitude of the unmanned aerial vehicle is adjusted according to the attitude angle information, the current flight height and the throttle value.

The attitude angle information includes the pitch angle, the roll angle and the yaw angle.

Specifically, the unmanned aerial vehicle is controlled to be kept unchangeable in current flight height and hover with the preset roll angle, and the throttle value is controlled to be unchangeable.

step S36: Whether the unmanned aerial vehicle receives the positioning data or not is judged after waiting for the preset time threshold.

Specifically, after waiting for the preset time threshold, interference factors can be eliminated so that the unmanned aerial vehicle can receive the GPS signals, or influences on the binocular vision positioning manner can be weakened, and accordingly, the positioning data can be reacquired.

step S38: If the unmanned aerial vehicle does not receive the positioning data, the unmanned aerial vehicle is controlled to hover and drop to the set height, the current throttle value of the unmanned aerial vehicle is controlled to be unchangeable, and the current roll angle of the unmanned aerial vehicle is kept at the preset roll angle.

step S40: The flight attitude is adjusted into a protection attitude when it is detected that the flight height of the unmanned aerial vehicle is lower than a preset height threshold.

Specifically, the pitch angle and the roll angle are kept within the preset angle range, the yaw angle is controlled to be kept unchangeable, and the throttle value is controlled to be reduced to zero with a preset rate. After waiting for the preset time threshold, the pitch angle and the roll angle are kept within the preset angle range, the flight height of the unmanned aerial vehicle is reduced, and the yaw angle is controlled to rotate with the preset angular rate.

In the embodiment of the present disclosure, the provided unmanned aerial vehicle protection method includes: after a positioning system of the unmanned aerial vehicle fails, a flight speed of the unmanned aerial vehicle is acquired at a time point before the positioning system fails, the flight state of the unmanned aerial vehicle is determined according to the flight speed; and the flight protection strategy of the unmanned aerial vehicle is adjusted according to the flight state. After the positioning system of the unmanned aerial vehicle fails, acquiring the flight speed of the unmanned aerial vehicle at the time before the positioning system fails, and then the flight state of the unmanned aerial vehicle is determined according to the flight speed, where the flight state includes the low-speed flight state and the high-speed flight state; and then the flight protection strategy of the unmanned aerial vehicle is adjusted according to the flight state. The above method can reduce the explosion probability of the unmanned aerial vehicle, and improve flight safety of the unmanned aerial vehicle after the system of the unmanned aerial vehicle fails.

It should be explained that, in the above embodiments, the above steps do not necessarily have a certain sequential order, according to descriptions of the embodiments of this application, those of ordinary skill in the art can understood that the above steps may have different execution sequences in the different embodiments, that is, the above steps may be executed in parallel and may also be exchanged to be executed.

According to another aspect of the embodiment of this application, the embodiment of this application provides an apparatus 80 for protecting an unmanned aerial vehicle. Please refer to FIG. 8, and the apparatus 80 for protecting an unmanned aerial vehicle includes: a flight speed acquiring module 81, a flight state determining module 82 and a flight protection strategy adjusting module 83.

Figure 8:
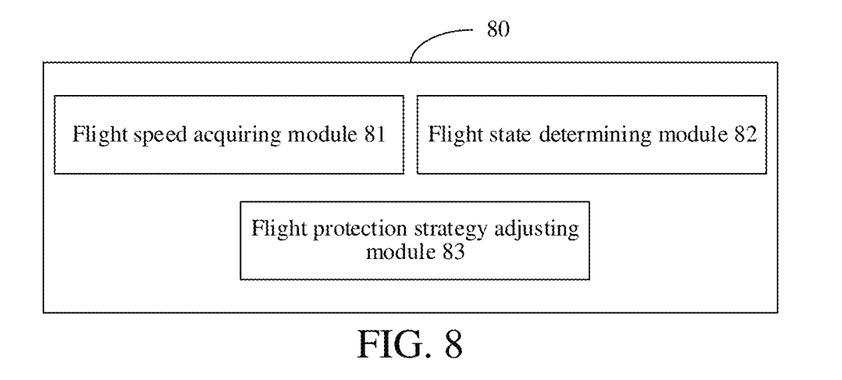
FIG. 8 is a structure block diagram of an apparatus for protecting the unmanned aerial vehicle according to an embodiment of the present disclosure.

The flight speed acquiring module 81 is configured to acquire a flight speed of an unmanned aerial vehicle at a time point before a positioning system fails after the positioning system of the unmanned aerial vehicle fails;

the flight state determining module 82 is configured to determine a flight state of the unmanned aerial vehicle according to the flight speed; and the flight protection strategy adjusting module 83 is configured to adjust a flight protection strategy of the unmanned aerial vehicle according to the flight state.

Thus, in the embodiment of the present disclosure, after the positioning system of the unmanned aerial vehicle fails, acquiring the flight speed of the unmanned aerial vehicle at the time point before the positioning system fails, and then the flight state of the unmanned aerial vehicle is determined according to the flight speed, where the flight state includes the low-speed flight state and the high-speed flight state; and then the flight protection strategy of the unmanned aerial vehicle is adjusted according to the flight state. The above method can reduce the explosion probability of the unmanned aerial vehicle, and improve flight safety of the unmanned aerial vehicle after positioning sensors of the unmanned aerial vehicle are in failure.

It should be explained that, the above unmanned aerial vehicle protection apparatus can execute the unmanned aerial vehicle protection method provided by the embodiment of the present disclosure, and has corresponding functional modules for performing the method and corresponding beneficial effects. For technical details not described in detail in the embodiment of the apparatus 80 for protecting an unmanned aerial vehicle, please refer to the method for protecting an unmanned aerial vehicle provided by the embodiment of the present disclosure.

Figure 9:
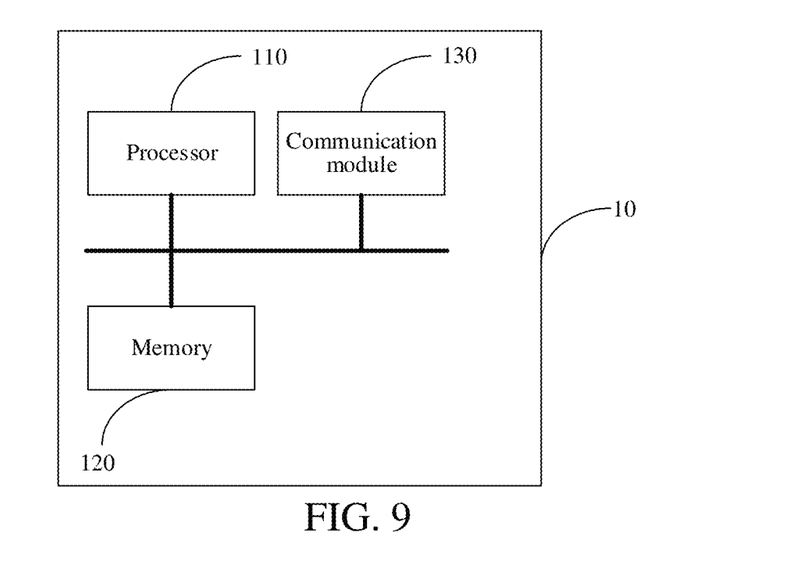
FIG. 9 is a structure block diagram of an unmanned aerial vehicle according to an embodiment of the present disclosure.

Refer to FIG. 9, and FIG. 9 is a structure block diagram of an unmanned aerial vehicle according to an embodiment of the present disclosure.

As shown in FIG. 9, the unmanned aerial vehicle 10 may include: an unmanned aerial vehicle body, unmanned aerial vehicle arms, power systems, a magnetometer, multiple kinds of sensors, a flight controller and a communication module 130. The flight controller includes a processor 110 and a memory 120.

The unmanned aerial vehicle arms are connected to the unmanned aerial vehicle body, and the power systems are arranged on the unmanned aerial vehicle arms and configured to provide flight power for the unmanned aerial vehicle.

The multiple kinds of sensors are configured to respectively collect corresponding flight data and may be more of an accelerometer, a gyroscope, the magnetometer, a GPS navigator and a vision sensor.

Communication connection between any two of the processor 110, the memory 120 and the communication module 130 is established in a bus manner.

The processor 110 may be any type of processor 110 having one or more processing cores. The processor can perform single-thread or multi-thread operations and is configured to parse instructions so to perform operations of acquiring data, performing a logic operation function, issuing an operation processing result, etc.

The memory 120 serving as a non-transitory computer-readable storage medium may be configured to store non-transitory software programs, non-transitory computer executable programs and modules, such as program instructions/modules (e.g., the flight speed acquiring module 81, the flight state determining module 82 and the flight protection strategy adjusting module 83 shown in FIG. 8) corresponding to the unmanned aerial vehicle protection method in the embodiment of the present disclosure. The processor 110 executes various function applications and data processing of the unmanned aerial vehicle protection apparatus 80 by operating the non-transitory software programs, instructions and modules stored in the memory 120, thereby realizing the unmanned aerial vehicle protection method in any above method embodiment.

The memory 120 may include a program storage zone and a data storage zone, where the program storage zone may store an operating system and application programs needed by at least one function; and the data storage zone may store data established according to usage of the unmanned aerial vehicle protection apparatus 80. In addition, the memory 120 may include a high-speed random access memory, and may also include a non-transitory memory, such as at least one of a magnetic memory device, a flash memory, or other non-transitory solid-state memories. In some embodiments, the memory 120 may optionally include memories remotely disposed relative to the processor 110, and the remote memories may be connected to the unmanned aerial vehicle 10 through networks. The examples of the above networks include but not limited to an Internet, an intranet, a local area network, a mobile communication network and a combination thereof.

The memory 120 stores instructions capable of being executed by the at least one processor 110, and the at least one processor 110 is configured to execute the instructions so as to implement the method for protecting an unmanned aerial vehicle according to any above method embodiment, for example, the step S10, the step S20, the step S30, of the above described method are executed to realize the functions of the modules 81-83 in FIG. 8.

The communication module 130 is a functional module configured to establish communication connection and provide a physical channel. The communication module 130 may be any type of wireless or wired communication module 130, and includes but not limited to a WiFi module or a Bluetooth module, or the like.

Furthermore, the embodiment of the present disclosure further provides a non-transitory computer-readable storage medium. The non-transitory computer-readable storage medium stores computer executable instructions. The computer executable instructions are executed by one or more processors 110 and may be executed by one processor 110 in FIG. 9 so that the above one or more processors 110 can execute the unmanned aerial vehicle protection method in any above method embodiment, such as the step S10, the step S20 and the step S30 of the above described method are executed to realize the functions of the modules 81-83 in FIG. 8.

The foregoing described apparatus embodiments are merely exemplary. The units described as separate parts may or may not be physically separate, and the parts displayed as units may or may not be physical units, may be located in one position, or may be distributed on a plurality of network units. Some or all of the modules may be selected according to actual needs to achieve the objectives of the solutions of the embodiments. Some or all of the modules may be selected according to actual needs to achieve the objectives of the solutions of the embodiments.

Through the descriptions of the foregoing implementations, those of ordinary skill in the art may clearly understand that the implementations may be implemented by software in combination with a universal hardware platform, and may certainly be implemented by hardware. Those of ordinary skill in the art may understand that all or some of procedures of the method in the foregoing embodiments may be implemented in a manner that a computer program in a computer program product instructs associated hardware. The computer program may be stored in the non-transitory computer-readable storage medium. The computer program includes program instructions, and when the program instructions are executed by associated devices, the associated devices may execute procedures of the embodiments of the foregoing methods. The storage medium may be a magnetic disk, an optical disc, a read-only memory (ROM), a random access memory (RAM) or the like.

The above product can execute the method for protecting an unmanned aerial vehicle provided by the embodiment of the present disclosure, and has corresponding functional modules for performing the unmanned aerial vehicle protection method and corresponding beneficial effects. For technical details not described in detail in the embodiment, please refer to the unmanned aerial vehicle protection method provided by the embodiment of the present disclosure.

Finally, it should be noted that: the foregoing embodiments are merely used for describing the technical solutions of the present disclosure, but are not intended to limit the present disclosure. Under the ideas of the present disclosure, the technical features in the foregoing embodiments or different embodiments may also be combined, the steps may be performed in any order, and many other changes of different aspects of the present disclosure also exist as described above, and these changes are not provided in detail for simplicity. Although the present disclosure is described in detail with reference to the foregoing embodiments, it should be understood by a person skilled in the art that, modifications may still be made to the technical solutions described in the foregoing embodiments, or equivalent replacements may be made to the part of the technical features; and these modifications or replacements will not cause the essence of corresponding technical solutions to depart from the scope of the technical solutions in the embodiments of the present disclosure.

What is claimed is:

1. A method for protecting an unmanned aerial vehicle, the method comprising:
    acquiring a flight speed of the unmanned aerial vehicle before the positioning system fails;
    determining a flight state of the unmanned aerial vehicle according to the flight speed; and
    controlling the unmanned aerial vehicle to adjust a flight protection strategy of the unmanned aerial vehicle according to the flight state.

2. The method according to claim 1, wherein the flight state comprises a low-speed flight state and a high-speed flight state, and the determining a flight state of the unmanned aerial vehicle according to the flight speed comprises:
    determining the flight state of the unmanned aerial vehicle as the low-speed flight state when the flight speed is within a low-speed threshold range; and
    determining the flight state of the unmanned aerial vehicle as the high-speed flight state when the flight speed is within a high-speed threshold range.

3. The method according to claim 2, wherein the adjusting a flight protection strategy of the unmanned aerial vehicle according to the flight state comprises:
    acquiring attitude angle information and a current flight height of the unmanned aerial vehicle when the flight state is the low-speed flight state;
    adjusting the flight attitude of the unmanned aerial vehicle according to the attitude angle information;
    controlling the unmanned aerial vehicle to climb to a preset height from the current flight height after waiting for a preset time threshold; and
    determining if the unmanned aerial vehicle receives positioning data;
    adjusting the flight attitude into a protection attitude if the unmanned aerial vehicle does not receive the positioning data.

4. The method according to claim 3, wherein
    the attitude angle information comprises a pitch angle, a roll angle and a yaw angle; and
    the adjusting the flight attitude of the unmanned aerial vehicle according to the attitude angle information comprises:
    keeping the pitch angle and the roll angle within a preset angle range, and controlling the yaw angle to be unchanged.

5. The method according to claim 4, wherein the adjusting the flight attitude into a protection attitude comprises:
    keeping the pitch angle and the roll angle within the preset angle range, reducing a flight height of the unmanned aerial vehicle, and controlling the yaw angle to rotate with a preset angular rate.

6. The method according to claim 2, wherein the adjusting a flight protection strategy of the unmanned aerial vehicle according to the flight state comprises:
    acquiring attitude angle information, a current flight height and a throttle value of the unmanned aerial vehicle when the flight state is the high-speed flight state;
    adjusting the flight attitude of the unmanned aerial vehicle according to the attitude angle information, the current flight height and the throttle value;
    determining if the unmanned aerial vehicle receives positioning data after waiting for the preset time threshold;
    if the unmanned aerial vehicle does not receive the positioning data, controlling the unmanned aerial vehicle to hover and drop to a set height, controlling a current throttle value of the unmanned aerial vehicle to be unchanged, and keeping a current roll angle of the unmanned aerial vehicle at a preset roll angle; and
    adjusting the flight attitude into the protection attitude when the flight height of the unmanned aerial vehicle is detected to be lower than a preset height threshold.

7. The method according to claim 6, wherein
    the attitude angle information comprises a pitch angle, a roll angle and a yaw angle; and
    the adjusting the flight attitude of the unmanned aerial vehicle according to the attitude angle information, the current flight height and the throttle value comprises:
    controlling the current flight height of the unmanned aerial vehicle to be unchanged and hover with the preset roll angle, and controlling the throttle value to be unchanged.

8. The method according to claim 7, wherein the adjusting the flight attitude into a protection attitude when the unmanned aerial vehicle is detected to be lower than a preset height threshold comprises:
    keeping the pitch angle and the roll angle within a preset angle range, controlling the yaw angle to be unchanged, and controlling the throttle value to be reduced to zero with a preset rate; and
    after waiting for a preset time threshold, keeping the pitch angle and the roll angle within the preset angle range, reducing the flight height of the unmanned aerial vehicle, and controlling the yaw angle to rotate with a preset angular rate.

9. The method according to claim 4, wherein the preset angle range is (−2°, 2°).

10. The method according to claim 8, wherein the preset angle range is (−2, 2°).

11. A non-transitory computer readable medium comprising an apparatus for protecting an unmanned aerial vehicle that, when executed by a processor, performs:
    acquiring a flight speed of an unmanned aerial vehicle before a positioning system fails;
    determining a flight state of the unmanned aerial vehicle according to the flight speed; and
    controlling the unmanned aerial vehicle to adjust a flight protection strategy of the unmanned aerial vehicle according to the flight state.

12. An unmanned aerial vehicle, comprising:
    an unmanned aerial vehicle body;
    unmanned aerial vehicle arms connected to the unmanned aerial vehicle body;
    a power system arranged on the unmanned aerial vehicle arms and configured to provide flight power for the unmanned aerial vehicle; and
    a flight controller arranged on the unmanned aerial vehicle body,
    wherein the flight controller comprises:
    at least one processor; and a memory which is in communication connection with the at least one processor, wherein the memory stores instructions executable by the at least one processor, and the instructions, when executed by the at least one processor, cause the at least one processor to:

acquire a flight speed of the unmanned aerial vehicle before the positioning system fails, determine a flight state of the unmanned aerial vehicle according to the flight speed; and controlling the unmanned aerial vehicle to adjust a flight protection strategy of the unmanned aerial vehicle according to the flight state.

13. The unmanned aerial vehicle according to claim 12, wherein the flight state comprises a low-speed flight state and a high-speed flight state, and the at least one processor is configured to:

determine the flight state of the unmanned aerial vehicle as the low-speed flight state when the flight speed is within a low-speed threshold range; and determine the flight state of the unmanned aerial vehicle as the high-speed flight state when the flight speed is within a high-speed threshold range.

14. The unmanned aerial vehicle according to claim 13, wherein the at least one processor is further configured to:

acquire attitude angle information and a current flight height of the unmanned aerial vehicle when the flight state is the low-speed flight state;

adjust the flight attitude of the unmanned aerial vehicle according to the attitude angle information;

control the unmanned aerial vehicle to climb to a preset height from the current flight height after waiting for a preset time threshold; and in response to determining that the unmanned aerial vehicle does not receive positioning data, adjust the flight attitude into a protection attitude.

15. The unmanned aerial vehicle according to claim 14, wherein the attitude angle information comprises a pitch angle, a roll angle and a yaw angle; and the at least one processor is further configured to:

keep the pitch angle and the roll angle within a preset angle range, and control the yaw angle to be unchanged.

16. The unmanned aerial vehicle according to claim 15, wherein the at least one processor is further configured to:

keep the pitch angle and the roll angle within the preset angle range, reduce a flight height of the unmanned aerial vehicle, and control the yaw angle to rotate with a preset angular rate.

17. The unmanned aerial vehicle according to claim 13, wherein the at least one processor is further configured to:

acquire attitude angle information, a current flight height and a throttle value of the unmanned aerial vehicle when the flight state is the high-speed flight state;

adjust the flight attitude of the unmanned aerial vehicle according to the attitude angle information, the current flight height and the throttle value;

in response to determining that the unmanned aerial vehicle does not receive positioning data after waiting for the preset time threshold, control the unmanned aerial vehicle to hover and drop to a set height, control a current throttle value of the unmanned aerial vehicle to be unchanged, and keep a current roll angle of the unmanned aerial vehicle at a preset roll angle; and adjust the flight attitude into the protection attitude when the flight height of the unmanned aerial vehicle is detected to be lower than a preset height threshold.

18. The unmanned aerial vehicle according to claim 17, wherein the attitude angle information comprises a pitch angle, a roll angle and a yaw angle; and the at least one processor is further configured to:

control the current flight height of the unmanned aerial vehicle to be unchanged and hover with the preset roll angle, and control the throttle value to be unchanged.

19. The unmanned aerial vehicle according to claim 18, wherein the at least one processor is further configured to:

keep the pitch angle and the roll angle within a preset angle range, control the yaw angle to be unchanged, and control the throttle value to be reduced to zero with a preset rate; and after waiting for a preset time threshold, keep the pitch angle and the roll angle within the preset angle range, reduce the flight height of the unmanned aerial vehicle, and control the yaw angle to rotate with a preset angular rate.

* * * * *